April 14, 1964

C. O. BADGETT 3,128,786

RADIATION DENSITY GAUGE CONTROL OF SLUDGE
TRANSFER OPERATIONS IN SEWAGE WORKS

Filed Nov. 27, 1959

INVENTOR
Charles O. Badgett

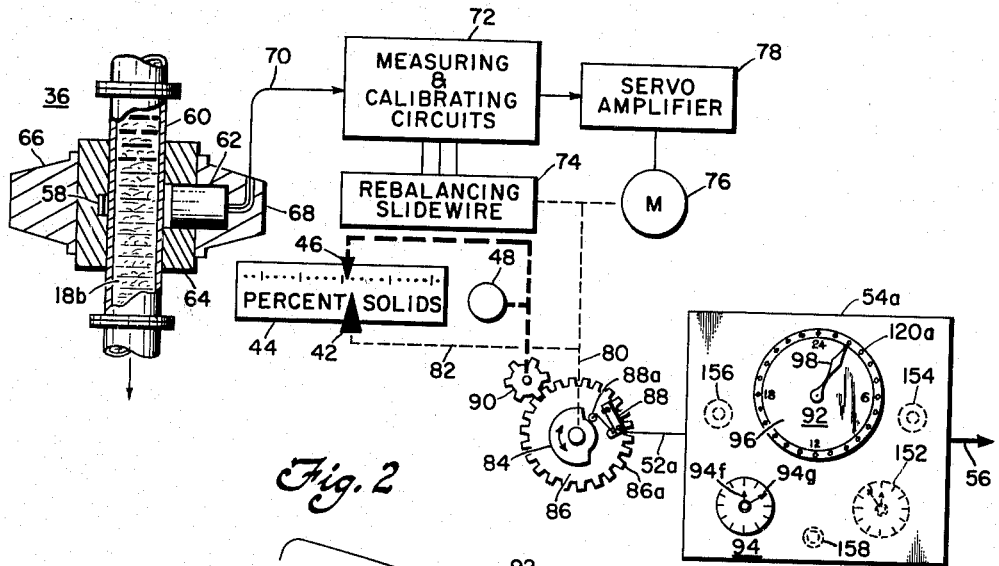

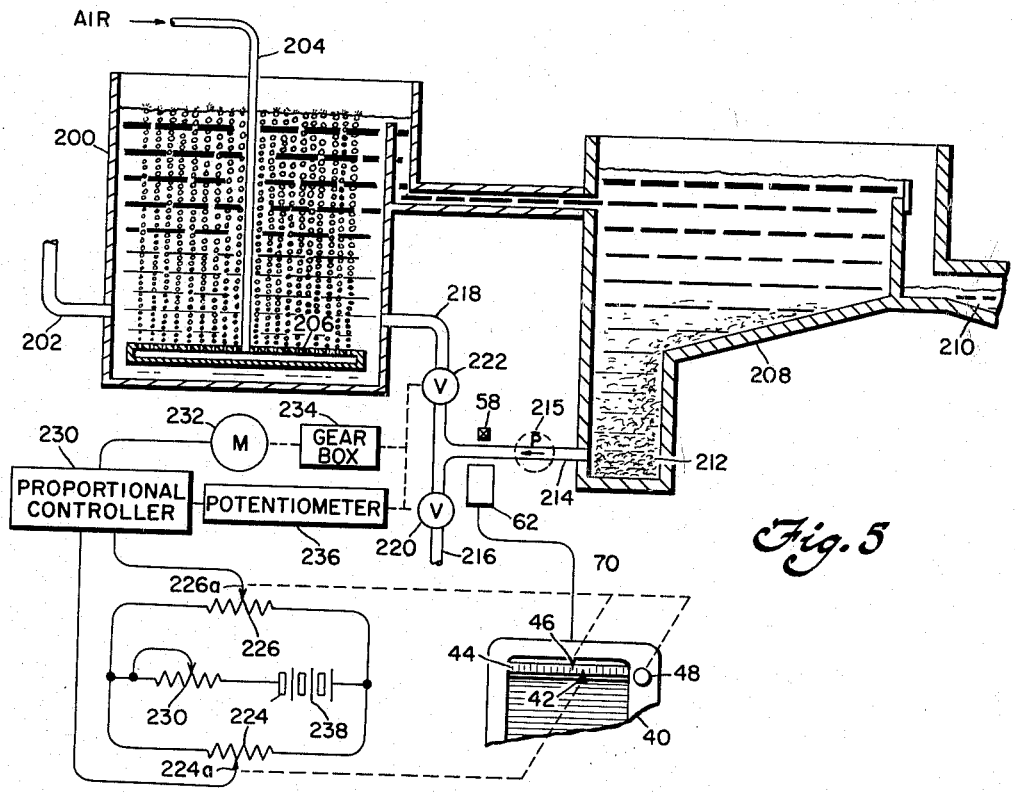
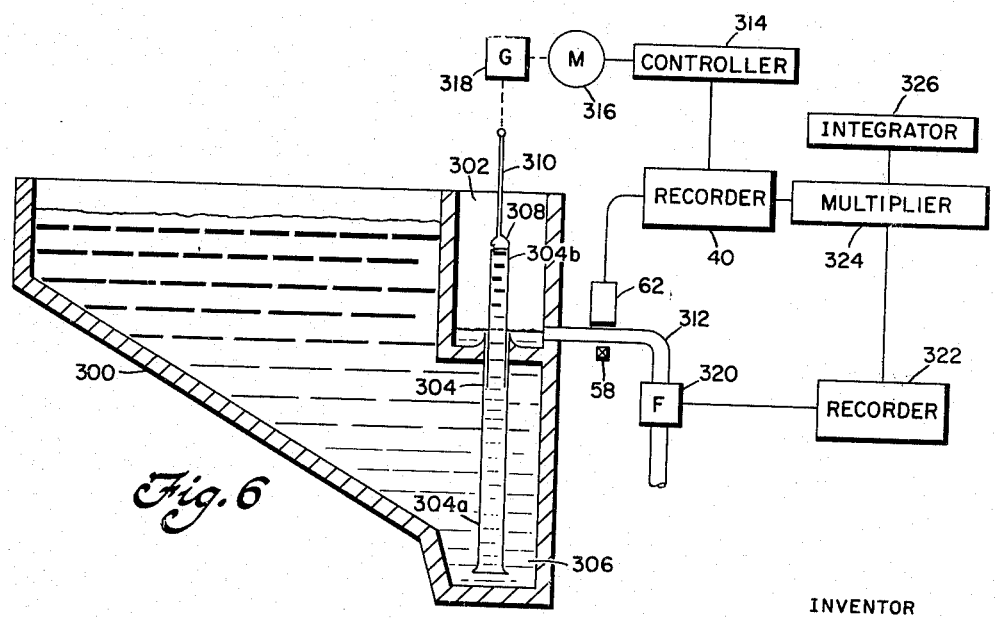

United States Patent Office 3,128,786
Patented Apr. 14, 1964

3,128,786
RADIATION DENSITY GAUGE CONTROL OF SLUDGE TRANSFER OPERATIONS IN SEWAGE WORKS
Charles O. Badgett, Columbus, Ohio, assignor to Industrial Nucleonics Corporation, a corporation of Ohio
Filed Nov. 27, 1959, Ser. No. 855,856
2 Claims. (Cl. 137—467.5)

This invention relates to sewage treatment processes and the like, and more particularly it relates to a novel method and means for controlling sludge transfer operations so as to maintain optimum solids concentrations in various sections of the plant, thereby enabling the treatment processes to proceed at top efficiency.

In a sewage treatment system, the principal processes are concerned with the separation of organic materials and inert solids from the aqueous carrier. Presedimentation, chemical precipitation, trickling filtration, activated sludge processes and the like are all accompanied by the settling out of solids to form sludge, which must be removed from its deposition place and either return to active circulation in the same process or removed to another process for disposal.

As is well known, it is a matter of great importance that sludge transfer operations should proceed when, and only when, the solids concentration of the sludge is within a certain optimum range. This becomes apparent, for example, in consideration of the characteristics of an anaerobic digester.

The anaerobic digester receives sludge from a settling tank, and, by a microbiological process, converts a major portion of the organic matter present to carbon dioxide and methane, leaving the solids content of the residue in a more purified condition. In order to achieve full utilization of digester capacity, the raw sludge should be introduced in the thickest possible condition. It has been found that it is possible to increase the concentration of this material into the range of about fifteen percent solids without any detrimental effect on digestion.

Assuming that at present the concentration of solids in the raw sludge introduced to digesters is about five percent, it is apparent that for every gallon of solid material processed, nineteen gallons of water must be moved, heated if necessary to the proper digester operating temperature, and provided with digester storage room during the required detention period. Now if the concentration of solids can be increased to ten percent, only nine gallons of water must be so handled along with each gallon of solid waste. This means that a given amount of sewage can be processed in a plant having only half the original sludge pump and digester capacity, and even less than half the heat exchanger or boiler capacity. Since digesters and associated equipment on the average account for about one-quarter to one-third of the construction cost of a sewage treatment system, there is a very obvious economic advantage in properly controlled sludge transfer operations.

The addition of only uniformly thick sludge to a digester is advantageous in other respects, as by minimizing the necessity for discharging excess quantities of supernatant liquor from the digester back into the sewage treatment process, thus avoiding the likelihood of malodorous conditions, or by reducing the necessary capacity of sludge concentration apparatus. Moreover, it results in an obvious saving of the space, equipment and operating expense associated with the eventual digested sludge dewatering process, since the required capacity thereof is dependent on the volume of liquid to be handled, regardless of the solids content.

Another example of the importance of solids-concentration-controlled sludge transfer is found in the activated sludge process, where activated sludge from the settling tank must be recirculated back through the aeration tank in order to maintain the culture of aerobic microorganisms which effect the digestion of the organic materials. Here a proper balance between sludge return and sludge withdrawal must be maintained, so as to prevent depletion of the aerobia population on the one hand and to prevent excess sludge build-up and over-contamination of the effluent on the other.

The above stated principles are well recognized, and their application has received the best efforts of sewage plant designers and operating personnel. However, due to the limitations of prior methods and means for determining and controlling the solids content of transferred sludge, the practical application of these principles has been beset by serious operating difficulties which have rendered the attractive theoretical benefits largely unattainable in fact.

Prior to the present invention, sludge transfer operations have been regulated in a more or less unsatisfactory manner by the use of one or more of several techniques.

In one system, which is generally adapted only to small plants, the sludge is pumped into an open observation box before being transferred to the digester, so that the operator can estimate the solids content by stirring the sludge or merely watching the flow thereof. The results, however, are dependent on the subjective judgment of the operator, who is probably influenced more by the color of the sludge and variations in ambient light conditions than by the actual solids content. Although a fairly good measure of control can be achieved by this method with proper attention, it is very objectionable in that the sludge must be handled in the open, with the attendant odor problem and the necessity for continually washing down the observation box.

In an attempt to attain the benefits of direct observation of the sludge without handling it in the open, sight glasses have been installed in the sludge lines. However, being without the benefit of the "feel" of the stirrer or the opportunity to observe the behavior of the fluid under conditions of unconfined flow, the operator must be guided almost exclusively by color changes, and this is very unreliable since commonly the liquid sewage has a black and opaque appearance closely resembling that of the sludge. In many cases the behavior of the flow has been found to be a better indicator than the color, and this has led to the use of telescoping valves for observation of the flow.

It is the practice in some sewage plants to install small outlets in the sludge pipes, and to provide receptacles and catch basins thereunder, whereby a continual sampling of the sludge is made during the transfer thereof. Very accurate determinations of solids content can be made by evaporating the samples to dryness in the laboratory; however, the results are not usually available until twenty-four hours later, long after the transfer of the sludge has been completed and too late to utilize the results in controlling the current transfer operation. Hence for control purposes use is frequently made of the rapid centrifuge test, described by Symons and Torrey in Water Works and Sewage, March 1941, p. 106, which is "probably satisfactory enough for rough plant work, but . . . should be supplemented by actual solids determinations." While this method of controlling solids concentration is one of the best of the expedients previously employed, its accuracy and speed are quite limited, and it necessitates a continual clean-up operation.

Another expedient which has been employed to control sludge transfer is the use of programmed timers for actuating valves or turning pump motors on and off at set intervals. This system suffers from the difficulty that the rate of sludge deposition in settling tanks is not constant, and moreover the rate of flow through the pumps or gravity lines is variable and dependent on the unknown consistency of the sludge.

In all the above described prior methods for controlling sludge transfer, for obvious reasons the operations are always conducted so as to allow a substantial margin of safety in contemplation of the ever-present possibility of the sludge becoming so dense and thick that a stoppage occurs in the sludge lines and/or pumps. The natural consequence is that almost invariably too much liquid is transferred along with the sludge, with the unfavorable results which are apparent in view of the above discussion.

In accordance with the present invention, it has been found that sludge transfer operations can be effected in an accurate, reliable and automatic manner under the control of a penetrative radiation device responsive to the density of the flowing sludge. A preferred form of the invention utilizes a source of penetrative radiation, such as gamma rays, located on one side of the sludge pipe, and a detector of said radiation, such as an ionization chamber, on the opposite side of the pipe. The intensity of the rays penetrating the pipe and the sludge therein is variably attenuated in accordance with changes in the density of the sludge. The output of the radiation detector then provides an electrical signal which is processed by a suitable measuring instrument having an indicator or recorder to translate the signal into an appropriate reading in terms of density units or percent solids. The invention further provides a novel control system responsive to the indication of the radiation measuring instrument for automatically regulating the operation of the sludge transfer system.

It is the object of this invention to improve the efficiency and economy of sewage works and the like, by controlling the transfer of sludge in accordance with the solids content thereof as indicated by the density of the sludge.

It is also an object to provide a method and means whereby a greater volume of sewage can be handled by a plant having a given capacity of the sludge disposal apparatus.

It is likewise an object to provide a method and means for controlling sludge transfer operations in a completely enclosed system, so as to minimize objectionable odors and the necessity for many obnoxious clean-up operations.

It is another object to provide a method and means for continuously determining sludge solids content, in an automatic, reliable and instantaneous manner.

It is still another object to eliminate the need for laborious and time-consuming laboratory analyses in the determination of sludge solids content.

It is yet another object to provide apparatus for automatically starting and stopping the flow of sludge from a settling tank to a sludge processing apparatus so as to transfer only sludge having greater than a minimum solids content.

It is a further object to provide means for automatically regulating the rate of flow of sludge in accordance with the solids content thereof.

It is a still further object to provide a method and means for maintaining the proper balance of sludge return and withdrawal in an activated sludge process, so as to maintain a peak population of aerobia without permitting the discharge of excessive solids in the effluent.

It is an additional object to provide means for controlling the transfer of sludge having maximum solids content without undue risk of pump or sludge line stoppage.

Moreover, it is an object of this invention to provide apparatus in accordance with the above objects which is relatively inexpensive to build, easy to install with a minimum of modification to existing plant facilities, and which is reliable and economical in operation.

Other objects and advantages will become apparent in the following detailed description, taken in connection with the accompanying drawings, in which:

FIG. 2 is a more detailed showing of portions of FIG. 1.

FIG. 3 is a detailed schematic showing of the basic form of one type of controller suitable for use in the system of FIG. 1.

FIG. 5 is a schematic showing of an aerobic digestion process having an automatically controlled activated sludge balance system in accordance with the invention.

FIG. 6 illustrates one modification of the system of FIG. 5.

Figure 1:
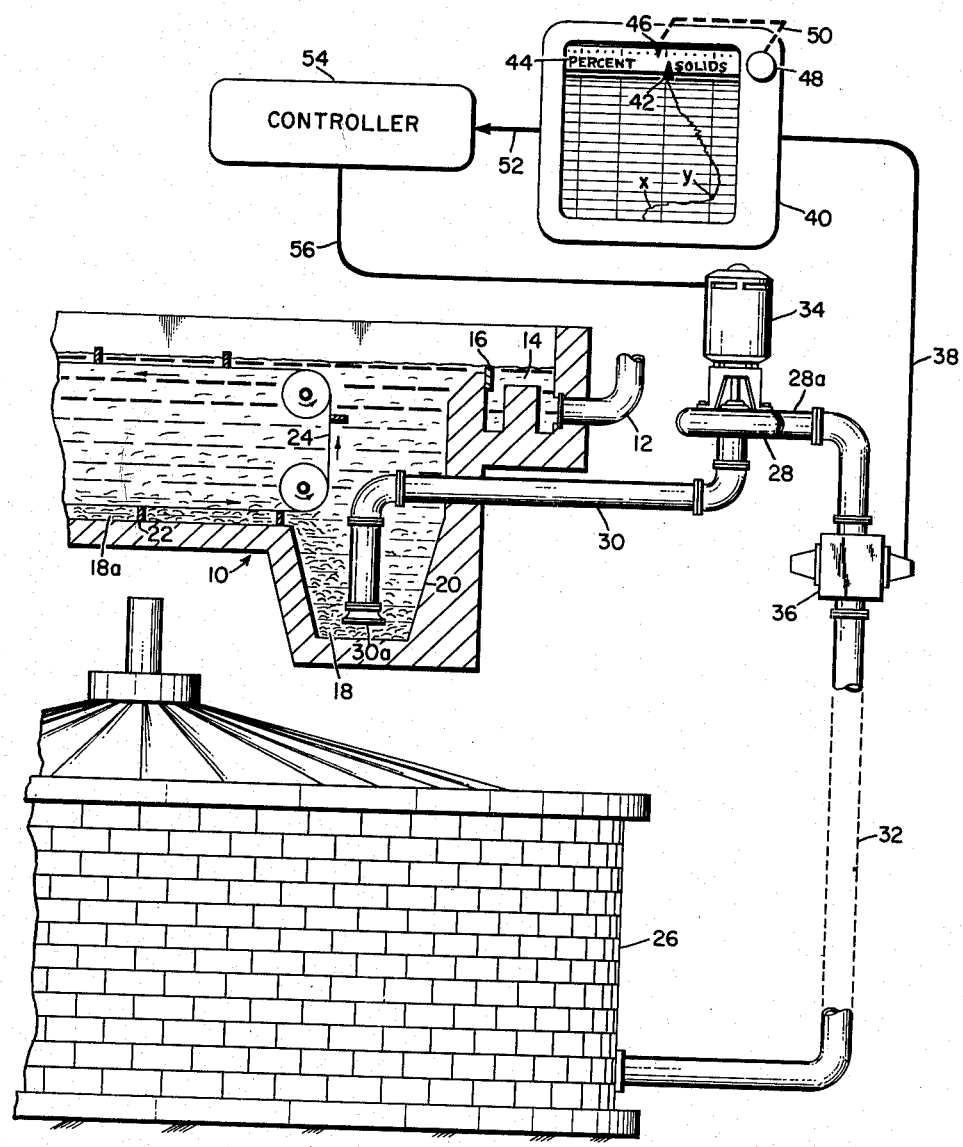
FIG. 1 is a showing of a portion of a sewage treatment plant having one form of a sludge transfer system in accordance with the invention.

Referring to FIG. 1, the numeral 10 indicates a primary settling tank having an inlet pipe 12 for receiving raw sewage, for example, as it may be delivered from the screens and grit chambers (not shown). The sewage flows into a baffle chamber 14, thence over a weir plate 16 into the main settling tank, and out the opposite end (not shown). In the main settling tank, solid particles settle out of the quiescent liquid and drift to the bottom of the tank to form sludge 18a which is scraped into a sludge hopper 20 by slow-moving wooden flights as at 22 carried on a conveyor chain 24.

In the sludge hopper 20, the sludge 18 accumulates and becomes relatively "packed" at the bottom of the hopper, whereas at the top of the hopper the solids content is much decreased. Specifically, in general the solids content and density of the sludge continuously increases with the depth thereof in the hopper.

Whenever the sludge 18 has reached a certain solids content, it becomes necessary to transfer the same to sludge disposal means, here illustrated as an anaerobic digester 26. Commonly the transfer is effected by a sludge pump 28 having an inlet pipe arrangement 30 descending into the sludge hopper 20 and terminating with a suction flange 30a near the bottom thereof. The pump outlet 28a is connected to the digester 26 by a sludge pipe 32. The pump 28 is preferably driven by an electric motor 34.

In accordance with one preferred embodiment of this invention, a radiation density gauging head 36, to be described, is installed in the sludge transfer line and coupled by an electrical cable 38 to an electrical indicating device 40. The indicating device preferably comprises a continuously measuring recorder having an indicating pen and pointer arrangement 42 and an associated scale 44 which may be calibrated in terms of percent solids as shown. The recorder also preferably includes a set-point indicating pointer 46, also cooperating with scale 44, and a set-point adjusting knob 48 mechanically coupled to the pointer 46 as indicated by the dotted line 50. The recorder 40 is connected via a multiconductor cable 52 to a controller 54, which regulates the application of electrical power to the pump motor 34, the power connections to the motor being indicated by line 56.

Referring now to FIG. 2, the radiation density gauging head 36 of FIG. 1, comprises a source 58 of penetrative radiation located on one side of a pipe section 60, and radiation detector 62 located on the opposite side thereof. A sealed capsule containing radioactive cesium-137 has been used as the source 58 with very satisfactory results in practice; however, it will be appreciated that certain other types of penetrating ray sources such as X-ray, beta ray or neutron sources can be adapted to this purpose. Likewise an ionization chamber has been employed as the radiation detector 62, although a Geiger-Mueller tube, scintillation counter or other type of detector may be used. For radiation health safety, the source 58 should be weld shielded against the emanation of penetrative rays into the external environment, and to this end a block 64 of the rust-resisting iron alloy known as Meehanite has been used to surround the measuring area of the pipe section 60, with lead-filled caps 66 and 68 providing additional shielding along the axis of the cavities which contain the source and detector. It is seen that item 60 consists of an integral, unbroken section of pipe which completely isolates the radioactive source capsule from the flow of sludge through the gauge.

The radiation detector 62 is connected by conductors 70 to suitable measuring and calibrating circuits 72, electrically associated with a rebalancing slidewire 74 which is driven by a servo motor 76 energized by a servo amplifier 78. The detailed structure and operation of the combination of items 72–78 is set forth in U.S. Patent No. 2,790,945, issued April 30, 1957, to H. R. Chope, and accordingly only brief mention of this apparatus need be made herein. In brief, however, the system functions as follows:

The sludge 18b within the pipe section 60 comprises water and a variable amount of solids. The latter, when in a dry state, are found to have a density of about 2.3–2.4 grams per cubic centimeter, compared to the essentially unit density of the water. Hence the mass of the sludge in the path of the penetrating rays between the source 58 and the detector 62 is proportional to solids content. Since the radiation traversing this path is variably attenuated in dependence on the mass of the sludge, the signal output of the detector 62 varies therewith. Calibrating circuits provided in box 72 are adapted to permit correlation of the variable signal with the actual solids content of the sludge 18b as determined by laboratory analysis. When the instrument is suitably calibrated, the action of the servo motor 76 is to continuously drive the slidewire to a point of balance with the value of the detector output signal, and, through mechanical connections indicated by the dotted lines 80 and 82, the recording indicator 42 is simultaneously driven to a point on scale 44 which indicates the instantaneous value of the solids content.

When the recorder 40 is adapted to one preferred form of the automatic controller 54, the servo motor 76 is arranged to drive a rotating cam 84 which is concentrically mounted with a cooperating switch plate 86. Secured to the switch plate is a suitable microswitch 88 having an arm 88a which bears against the periphery of the cam 84. The switch plate 86 carries a ring gear 86a which coacts with a spur gear 90. The spur gear is mechanically connected to the target pointer 46 and the set-point adjusting knob 48 so that when the knob 48 is manually adjusted to set the target pointer 46 in a desired position relative to scale 44, the switch plate 86 will be set in a corresponding angular position. Accordingly, as the recording indicator 42 moves relative to scale 44, when the percent solids indicator 42 is located to the right of target pointer 46, the contacts of microswitch 88 are open; when the indicator 42 is located to the left of pointer 46, the contacts are closed. Via line 52a, the contacts of switch 88 are electrically connected into the circuits of the controller 54.

The controller may include a panel 54a for mounting a clock timer 92 and an interval timer 94 which cooperate with the microswitch 88 and other components of the controller to regulate the operation of the pump motor in a manner set forth in FIG. 3.

One form of the clock timer 92 comprises a twenty-four-hour clock dial 96 having an associated hour hand 98 carried on a shaft 100 driven by a synchronous motor 102 and gear box 104 arrangement through a drag clutch 106 which permits setting the time of day by manual relocation of hour hand 98. To adapt the clock to perform a time switching function, it is provided with a selective commutator device including an integral pair of electrically conductive wipers 110 and 112 insulatingly secured to shaft 100 and driven in fixed relation to hour hand 98. Moving wiper 110 bears against a stationary metallic slip ring 114, while the other wiper 112 travels around the face of a stationary insulating ring 116 having a plurality of metallic contact buttons as at 118 molded therein. Each contact button is connected through an individual switch as at 120 to a bus ring 122, the other switches not being shown in the drawing. The switches as at 120 may be of the simple pin jack variety and settable to open or closed position by means of small plunger knobs as at 120a located on the periphery of the clock dial 96 in line with the dial markers thereon. A circuit to be controlled is connected via a lead 124 to the bus ring 122, and via a lead 126 to the slip ring 114. Hence the external circuit, normally open, will be closed while the wiper 112 is passing over a contact button as at 118 when its associated plunger switch as at 120 has been set to closed position. For example, if switch plunger 120a, at three o'clock on the dial 96, is set to close its associated switch 120, an electrical contact between leads 124 and 126 will occur at three o'clock a.m.

At 128 there is shown a D.C. power supply comprising a bridge rectifier energized from the conventional 110 v. A.C. power source 130 which also supplies power to lines 132 and 134 so as to drive the clock motor 102 and other circuits of the controller. The rectifier bridge 128 supplies D.C. lines 124a and 136.

In circuit with the D.C. power supply lines 124a and 136 and the clock timer 92 is a clock relay 138 with contacts 138a and 138b which in turn are in circuit with a pulse relay 140 and a capacitor 142.

In circuit with the power supply lines 132 and 134 are a set of contacts 140a of the pulse relay 140, and a hold relay 144 having contacts 144a. The circuit further includes the interval timer 94 of FIG. 2 which comprises a synchronous motor 94a, an electric clutch 94b, and a trip mechanism 94c which controls switch contacts 94d and 94e. It is seen that contacts 94e are in parallel with the contacts 88b of the microswitch 88 (FIG. 2) which is associated with the recorder mechanism. Contacts 88b, 94e, 140a and 144a are in circuit with a control relay 146.

The block diagram portion of FIG. 3 depicts the conventional circuits of the pump motor 34 as modified for automatic control. These circuits may include a polyphase power source 148, motor relays 150 and the regular manual controls 151. In accordance with this invention, an automatic-manual transfer switch 153 is preferably provided so that the mode of motor operation can be transferred either to the manual control 151 or to the automatic control contacts 146a of the control relay 146.

The operation of the apparatus depicted in FIGS. 1, 2 and 3 can now be described. Assuming that the sludge hopper 20 has been "emptied" of sludge, some time will elapse before the settlings from the tank 10 can build up a "packed" accumulation of dense sludge in the hopper. During this interval the sludge transfer system is at rest, awaiting the time when a sludge transfer operation should be initiated. It is also assumed that this time is three o'clock, and that the clock timer 92 has been set accordingly by means of switch knob 120a. At three o'clock, then, the wiper 112 of the clock switch will make connection with the contact button 118. A circuit will now be completed from the D.C. power supply 128 through line 124, bus ring 122, plunger switch 120, contact button 118, wipers 112 and 110, slip ring 114, line 126 and clock relay 138 to the opposite side 136 of the D.C. power supply. Relay 138 will now be energized.

It is seen that capacitor 142 will have been connected through relay contacts 138a across D.C. power supply lines 124a and 136 and charged thereby. When relay 138 is energized, contacts 138a disconnect the charged capacitor from line 124a and contacts 138b will connect the capacitor across the coil 140 of the pulse relay. Thus the pulse relay will be momentarily energized, closing its contacts 140a. Shortly, capacitor 142 will discharge through relay coil 140 and contacts 140a will re-open. Now in order for the pulse relay to operate again, capacitor 142 must first be re-charged by being again connected to line 124a, and this does not occur until clock relay 138 is de-energized at a later time when the clock switch wiper 112 has passed over contact button 118 to break the circuit.

Hence it is seen that the sole function of the clock timer 92 and its associated relays and D.C. power supply is to cause the pulse relay contacts 140a to close momentarily whenever the hand 98 of the clock arrives at an hour which has been set by depressing the associated switch button on the clock dial.

The closure of the pulse relay contacts 140a energizes the hold relay 144, which locks in and holds through its own contacts 144a and the interval timer contacts 94e. Therefore, even though the pulse relay contacts 140a re-open immediately, power will still be applied to line 145 and the hold relay 144 will remain energized. It is seen that the coil 146 of the control relay is connected in parallel with the coil 144 of the hold relay. Hence relay 146 will operate its contacts 146a, which in turn cause the sludge pump motor 34 to operate by applying power thereto from the polyphase source 148 through the automatic-manual switch 153 and motor relays 150.

Referring to FIG. 1, when the sludge pump 28 is first started, the suction pipe 30, the pump, and the density gauging head 36 will contain relatively thin and watery sludge, so that the recorder 40 will show a trace as at $x$ indicating low solids content. Accordingly the microswitch 88 (FIG. 2) on the recorder will be open as indicated by the condition of contacts 88b in FIG. 3. It is the purpose of the interval timer 94 to provide the parallel connection through its contacts 94e so that power will remain on line 145 and thereby keep the control relay 146 energized and the pump 34 running until thick sludge from the hopper 20 is passing through the density gauging head 36 and producing a trace as at $y$ on the recorder 40. This causes the microswitch 88 to close its contacts 88b as the measuring indicator 42 passes to the right of the set point indicator 46.

The interval timer 94 (FIG. 2) is of a common type having a timing indicator 94f and a manually set interval selector 94g. When the sludge pump is started by energizing line 145 (FIG. 3) power is applied to the synchronous motor 94a of the timer through the timer contacts 94d. Power is also applied directly to the electric clutch 94b which connects the motor 94a to the trip mechanism 94c and also to the timing indicator 94f of FIG. 2 which slowly travels around the dial until it reaches the position of the interval selector indicator 94g. Thereupon the trip mechanism 94c is actuated, opening contacts 94d and 94e. The motor 94a stops, but the trip mechanism cannot reset while power remains applied to the clutch 94b from line 145.

As stated heretofore, by the time the interval timer 94 "times out" and opens its contacts 94e, thick sludge will have traveled therefrom from the sludge hopper 20 to the density gauging head 36 and increased the reading on the recorder so that microswitch contacts 88b will have closed before the timer contacts 94e open. Hence the holding circuit for the hold relay 144, the timer clutch 94b and the control relay 146 is completed solely through the density recorder microswitch. As the sludge pump 28 continues to operate, withdrawing the sludge 18 out of the hopper 20, the solids content of the sludge will gradually decrease as shown by the recorder trace of FIG. 1. When the indicated solids content has dropped below the set point indicated by the position of pointer 46, the microswitch contacts 88b open, removing power from line 145. Hold relay 144, timer clutch 94b and control relay 146 will be de-energized, the timer 94 will be reset, the pump motor 34 will stop, and all the original circuit conditions will again prevail.

Figure 4:
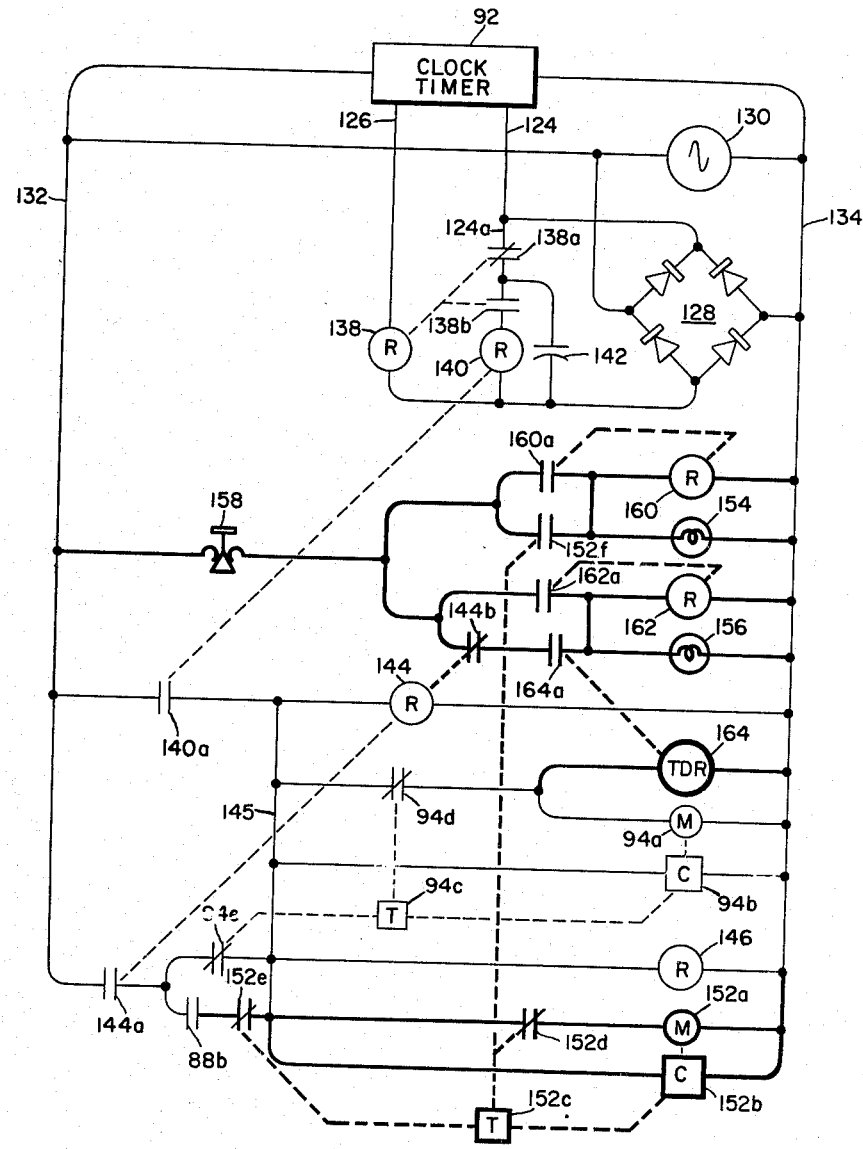
FIG. 4 is the electrical circuit diagram of a more elaborate controller, showing how the circuit of FIG. 3 may be modified to perform additional self-monitoring functions contributing to utility, efficiency and convenience of operation.

The apparatus described in connection with FIGS. 1 to 3 is a fully operative embodiment of the invention in one form thereof. FIG. 4 illustrates a circuit including novel and useful additions to the circuit of FIG. 3. These devices permit the sludge transfer system to be placed in fully automatic operation in a shorter period of time, and provide automatic trouble-shooting features.

The first device is represented by the additional timer indicated by the dotted lines 152 on the control panel 54a in FIG. 2. This timer is designed to shut off the sludge pump in the event that the density meter system has permitted the pump to run longer than a predetermined maximum period of time. If this occurs, it is desirable that the plant operating personnel be apprised of the fact, and to this end a warning light indicated by the dotted lines 154 may be placed on the control panel. Another occurrence requiring attention is in the case where the pump shuts off immediately after the minimum pumping interval timer 94 has timed out. Accordingly this occurrence is signaled by a further warning light indicated by the dotted lines 156. A pushbutton indicated by the dotted lines 158 is provided to reset the alarm signal light 154 and/or 156 before or after the difficulty has been investigated.

Referring to FIG. 4, the circuits of FIG. 3 are redrawn in light lines, whereas the modifications are shown by the heavy black lines. The maximum on time timer 152 is of the same type as the minimum on time timer 94, and comprises a synchronous motor 152a, a clutch 152b, a trip mechanism 152c and three sets of contacts 152d, 152e and 152f. The timer motor 152a is connected to line 145 through the normally closed timer contacts 152d; the clutch 152b is connected directly to line 145, and the normally closed timer contacts 152e are connected in series with the contacts 88b of the microswitch on the density gauge recorder.

The alarm signal lights 154 and 156 are connected in circuit with a normally closed pushbutton switch 158 across lines 132 and 134. A hold relay 160 is connected in parallel with the light 154, and a normally open set of contacts 160a of the hold relay 160 is connected in parallel with the contacts 152f of the timer 152. Another hold relay 162 is connected in parallel with the light 156 and a set of normally open contacts 162a of hold relay 162 connect the combination to line 32 through the pushbutton switch 158. A parallel circuit across contacts 162a includes an extra normally closed set of contacts 144b on hold relay 144, whose operation has been described, and a normally open set of contacts 164a of a time delay relay 164. The operating circuit of the time delay relay is connected in parallel with the synchronous motor 94a of the minimum on time timer 94.

The operation of the circuit as described in connection with FIG. 3 is unaltered except in (1) the case where the pump motor is shut off immediately when the timer 94 times out, or (2) in the case where the pump motor is still in operation at the end of a predetermined maximum interval which is set on timer 152.

Assuming that the sludge pump motor has been started as hereinabove described in connection with FIG. 3, it is seen that when power is applied to line 145 the normally closed contacts 144b of the hold relay 144 will open. The timer clutch 152b as well as the timer clutch 94b will be energized, and the timer motor 152a as well as timer motor 94a will start running. The time delay relay 164 will be energized in parallel with the timer motor 94a, and after a short interval the time delay relay contacts 164a will close. However, the light 156 and relay 162 will not be energized because contacts 144b are open.

In a normal situation, when the timer 94 times out and opens its contacts 94d and 94e, the density gauge microswitch contacts 88b will have closed to maintain the holding circuit for relay 144. In this case, power remains on line 145 and the sludge pump continues to run. However, the opening of timer contacts 94d removes power from the time delay relay 164, and after a short interval of delay the contacts 164a thereof will re-open. Accordingly when the microswitch contacts 88b remove power from line 145 and de-energize relay 144, the re-closing of its contacts 144b will not be able to energize the signal light 156.

On the other hand, consider an abnormal situation, for example, where the clock timer 92 has been improperly set so as to turn on the sludge pump at too-frequent intervals and the density of the sludge is initially less than the cut-off value. When the interval timer 94 times out and opens its contacts 94d and 94e, the density gauge microswitch contacts 88b will be open, power will be removed from line 145 immediately, and relay 144 will be de-energized and re-close its contacts 144b. In this case, due to the time delay action of relay 164 its contacts 164a will still be closed, and power will be applied to the signal light 156 and hold relay 162. Relay 162 will thereupon establish a holding circuit through its own contacts 162a and remain energized together with the light 156 until the holding circuit is broken by manual operation of pushbutton switch 158.

It is apparent that the alarm system utilizing signal lamp 156 is also effective to indicate the presence of any malfunction in the density gauge and recorder system which would prevent the instrument from properly closing the microswitch contacts 88b.

Referring now to the operation of the maximum on time timer 152, consider a normal situation wherein the sludge pump has been started and after its set interval the timer 94 has timed out, opening its contacts 94e. The holding circuit for relay 144 is completed through its contacts 144a, contacts 88b of the density recorder microswitch and contacts 152e of timer 152. Ordinarily, the sludge transfer operation will be completed when this holding circuit is opened by contacts 88b. As a result of the removal of power from line 145 and the clutch 152b, the timer 152 simply resets itself without any effect on the controller operation.

However, in an abnormal situation opposite to that just described, where for some reason the density gauge microswitch contacts 88b do not open and thereby shut off the sludge pump within a maximum allowable pumping time as set on timer 152, this timer will time out, opening its contacts 152e and thereby shutting off the sludge pump. This occurrence is signaled by alarm light 154, since the closure of timer contacts 152f will energize the same together with hold relay 160 which will establish a holding circuit for its coil 160 and the lamp 154 through contacts 160a. This holding circuit will be maintained until reset pushbutton 158 is manually depressed.

It may be desired in the last-mentioned situation to allow the pumping to continue after the alarm has been triggered, and if so, the function of contacts 152e can be dispensed with. Thus contacts 152d are employed to stop the timer motor 152a when the timer times out. These contacts also serve this purpose when contacts 152e are in the circuit, in case for some reason timer 94 fails to open its contacts 94e. Such a failure will of course be indicated by operation of the alarm signal lamp 154.

The proper setting of timer 152 must generally be determined by keeping records of the length of the pumping intervals over a period of time, but when the setting is found the alarm function is useful as an indicator of the possible need for a resetting of the clock timer 92 so as to initiate the pump cycle more frequently, for example, during a rainy season when increased sewage flow and higher flow velocities in tributary systems bring about a more than proportional increase in daily sludge deposition.

In FIG. 5 there is shown an aeration tank 200 receiving settled sewage through a conduit 202 which may be connected to the effluent end of the settling tank 10 of FIG. 1. The culture of aerobic bacteria which is maintained in tank 200 is supplied with air through a conduit 204 extending to the bottom of the tank and connected to a distribution system 206 having a network of metering orifices for generating suitably sized air bubbles which rise through the sewage and aerate the same. From the aeration tank the sewage flows into a final settling tank 208 and afterwards the final effluent thereof is discharged at the outlet 210 of the sewage works.

The activated sludge 212 which settles out of tank 208 is withdrawn periodically or continuously through a sludge pipe 214, either by gravity flow or through the agency of a pump 215. The sludge pipe 214 has two branches, one of which, shown at 216, leads to sludge disposal means such as an anaerobic digester, whereas the other branch 218 returns the activated sludge to the aeration tank 200 to maintain the population of the aerobic bacteria therein which digest the organic matter in the sewage. Each of the branch lines 216 and 218 of sludge piping is headed by a valve as indicated respectively at 220 and 222 whereby the balance of sludge withdrawal and sludge return can be adjusted.

In accordance with this invention, said balance is maintained by automatically controlling the positioning of valves 220 and 222 in accordance with a density indication provided as hereinabove described. To this end, the radiation source 58 and detector 62 are placed adjacent a section of the common sludge pipe 214. The indicating pen and pointer 42 of the recorder 40 are mechanically connected to the variable tap 224a of a repeat slidewire 224. The set-point indicator 46 is mechanically connected to the variable tap 226a of a potentiometer 226. Potentiometers 224 and 226 are connected into a bridge circuit energized by a voltage source 238 through a voltage dropping rheostat 230. The taps 224a and 226a are connected to the input of a conventional proportional controller 230 which controls the application of power to an electric motor 232. The motor 232 drives the valves 220 and 222 through a gear box 234. The gear box is arranged so that when motor 232 runs in one direction, valve 220 is driven toward its closed position and simultaneously valve 222 is driven toward its open position. When the motor 232 is reversed, the opposite effect obtains. The gear box output also drives a suitable potentiometer 236 in the circuit of the controller 230 whereby an electrical voltage representing the position of the valves is fed back to the error sensing element (not shown) of the controller. Since the control system 224–236 is of rather conventional design, a more detailed description thereof is deemed unnecessary herein.

One way in which the apparatus of FIG. 5 may be adjusted is such that when the indicators 42 and 46 are in vertical alignment there will be no potential difference between the taps 224a and 226a, that is, the input signal to the controller will be zero. At the same time, when the valves 220 and 222 have a particular setting, say, each valve half open, the potentiometer 236 will be set to deliver zero feedback voltage to effect balance in the controller and cause the motor 232 to remain at rest.

Now if the position of recorder indicator 42 deviates from the position of the set-point indicator 46, a deviation voltage will be developed between taps 224a and 226a of the bridge potentiometers. The polarity of this deviation voltage will depend on the direction of the indicator deviation, and the magnitude will be proportional to the amount of the indicator deviation and the setting of rheostat 230. In accordance with the polarity of the deviation voltage, the motor 232 will operate in the proper direction to drive the valves to a new position, wherein the feedback voltage from potentiometer 236 is equal and opposite to the deviation voltage.

It is seen that by the control system of FIG. 5 the flow of activated sludge returned through pipe 218 is maintained inversely proportional to the density of the sludge.

Referring now to FIG. 6, there is shown a further embodiment of the invention wherein a settling tank 300 is provided with a sludge well 302 and a conventional telescoping valve 304. Valve 304 includes an outer pipe 304a extending downwardly into the sludge hopper 306 and sealingly secured into the floor of the sludge well 302. An inner pipe 304b is slidingly mounted inside the outer pipe 304a and attached at its upper end to a spider 308 and lifting rod 310. The sludge flows upwardly through the telescoping valve and spills over the top of the inner pipe 304b at a rate dependent on the difference in height between the top of the movable pipe and the surface of the liquid in the settling tank 300. Accordingly the flow rate can be controlled by moving the rod 310 up or down. In this system, the withdrawal of the sludge takes place continuously, and the density of the transferred sludge is dependent on the rate of withdrawal thereof in relation to the deposition rate. The radiation source 58 and detector 62 are located adjacent the pipe 312 which drains the sludge well 302. The controller 314 employed in this instance is of a reset type such as disclosed in FIG. 2 of U.S. Patent No. 2,895,888 issued July 21, 1959, to Donald E. Varner. The actuator motor 316 is employed to reposition the telescoping valve lifter rod 310 through a gear arrangement 318.

The invention further contemplates the combination of the radiation measuring system with a suitable flowmeter to indicate or control the mass flow rate of sludge solids transferred. To this end a suitable flowmeter 320, for example, a magnetic flowmeter such as is manufactured and marketed by the Foxboro Company, is installed in the sludge line 312 and connected to a recorder 322. The recorders 40 and 322 are associated with a suitable computer 324 for multiplying the percent solids reading of recorder 40 by the flow rate reading of recorder 322 to derive an indication of the weight of dry solids transferred per unit time. For example, the two recorders may be equipped with repeat slidewires connected in the circuits of a conventional servo potentiometer multiplier which continuously records the dry solids transfer rate. Likewise the multipler 324 is adapted to provide an input signal to a suitable integrator 326, which may be of the type described in U.S. Patent No. 2,513,537 issued July 4, 1950, to F. C. Williams. The integrator is calibrated to continuously indicate the total weight of dry solids transferred.

It can be seen that the system of FIG. 6 is also useful for purposes such as the accurate loading of a digester with a specified number of pounds of dry solids, diluted with a minimum amount of water.

While the invention has been described and illustrated as being embodied in certain specific procedures and apparatus whereby the objects of the invention are fully accomplished, it is apparent that many modifications can be made to the disclosed procedures and apparatus, and many outwardly similar or quite different embodiments can be made, without departing from the spirit and scope of the invention as is set forth in the appended claims.

What is claimed is:

1. Apparatus for controlling the removal of sludge from a settling tank so as to withdraw therefrom only sludge having a desired solids content, which comprises sludge withdrawal means in connection with said settling tank for providing a flow of sludge from said tank, means for directing a beam of penetrative radiation selected from the group consisting of gamma rays, X rays, beta rays and neutrons across the path of said flow, means for quantitatively detecting a portion of said radiation which has been modified by interaction with the mass of said flow to provide an indication of the density of said flow, means for initiating operation of said sludge withdrawal means to start said flow, means for maintaining said operation for an interval not less than the time required for said flow of sludge to travel the distance from said settling tank to said detecting means regardless of said density indication, means responsive to said density indication for terminating said operation after the lapse of said interval when said density indication has been reduced to a selected value, and alarm signal means activated by failure of said density indication responsive means to terminate said operation within a pre-determined period of time after said lapse of said interval.

2. Apparatus for controlling the removal of sludge from a settling tank so as to withdraw therefrom only sludge having a desired solids content, which comprises sludge withdrawal means in connection with said settling tank for providing a flow of sludge from said tank, means for directing a beam of penetrative radiation selected from the group consisting of gamma rays, X rays, beta rays and neutrons across the path of said flow, means for quantitatively detecting a portion of said radiation which has been modified by interaction with the mass of said flow to provide an indication of the density of said flow, means for initiating operation of said sludge withdrawal means to start said flow, means for maintaining said operation for an interval not less than the time required for said flow of sludge to travel the distance from said settling tank to said detecting means regardless of said density indication, means responsive to said density indication for further maintaining said operation after the lapse of said interval whenever said density indication exceeds a selected value, and alarm signal means activated by failure of said density indication responsive means to maintain said operation after said lapse of said interval.

References Cited in the file of this patent

UNITED STATES PATENTS

| | | |
|---|---|---|
| 2,454,653 | Kamp | Nov. 23, 1948 |
| 2,586,447 | Way | Feb. 19, 1952 |
| 2,661,550 | Graham | Dec. 8, 1953 |
| 2,812,773 | McGee | Nov. 12, 1957 |
| 2,826,913 | Rosenberger | Mar. 18, 1958 |
| 2,911,826 | Kritz | Nov. 10, 1959 |